UNITED STATES PATENT OFFICE.

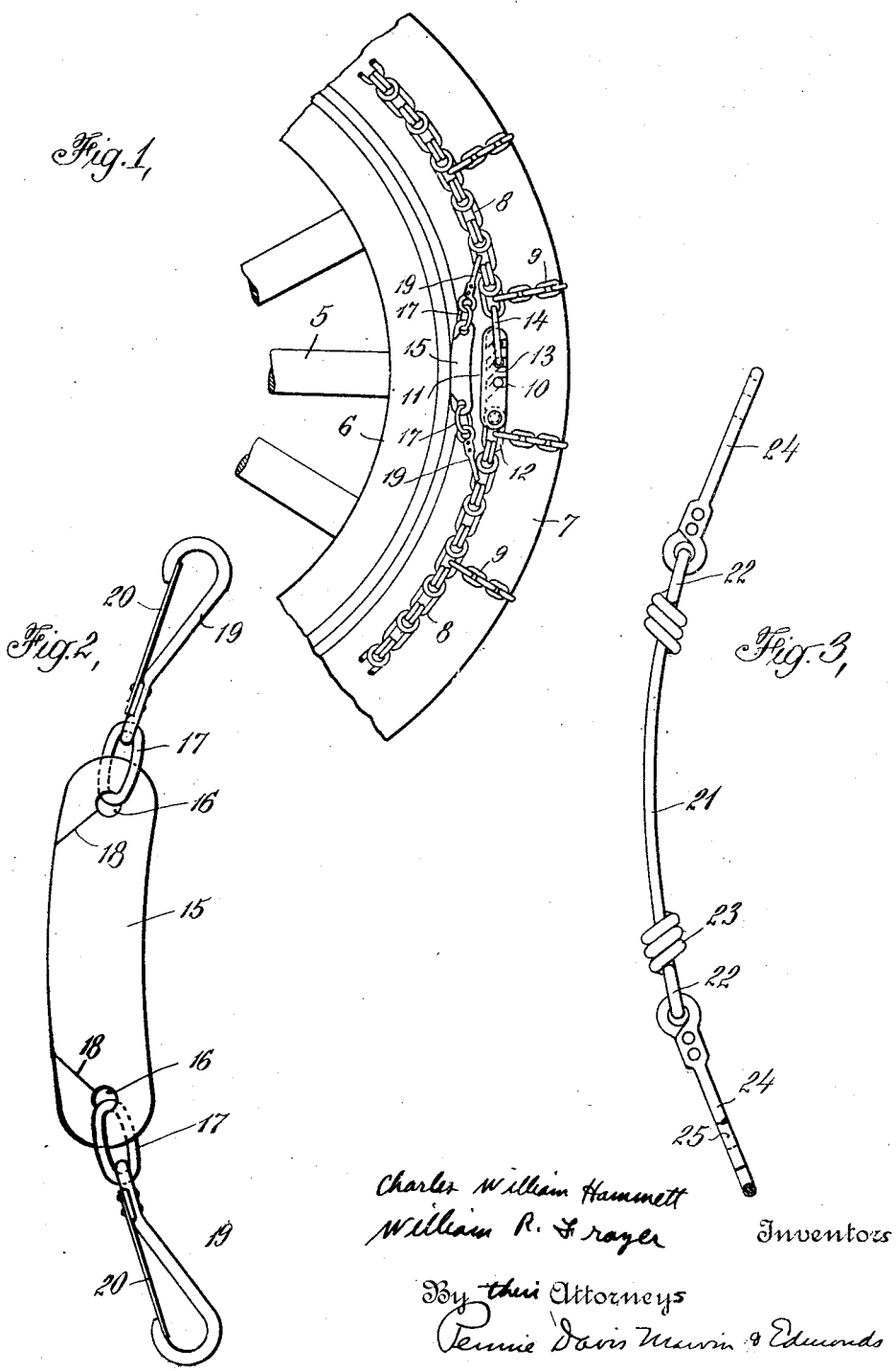

CHARLES WILLIAM HAMMETT AND WILLIAM R. FRAZER, OF NEW YORK, N. Y.

SAFETY-CONNECTOR FOR TIRE-CHAINS.

1,364,109.　　　　　Specification of Letters Patent.　　Patented Jan. 4, 1921.

Application filed January 20, 1920. Serial No. 352,679.

*To all whom it may concern:*

Be it known that we, CHARLES WILLIAM HAMMETT, a subject of the King of England, (first papers, full intentions to become U. S. A. citizen,) and WILLIAM R. FRAZER, a citizen of the United States, both residing at New York, county of New York, State of New York, have invented certain new and useful Improvements in Safety-Connectors for Tire-Chains; and we do hereby declare the following to be a full, clear, and exact description of the invention, such as will enable others skilled in the art to which it appertains to make and use the same.

Our invention relates to chains used on the wheels of motor driven vehicles to prevent skidding; and provides a safety device which will effectually prevent damage to the vehicle in the event that the usual fastening which secures the chains in place is broken.

Anti-skid chains are widely used on the wheels of motor driven vehicles when the traction surface is slippery. One type of chains consists of circumferential and transverse members embodying articulated links, the free ends of the circumferential members being joined by suitable connectors which permit mounting and dismounting of the chain as conditions require. The connectors are subjected in use to considerable stress and being the weakest part of the chain are occasionally broken. Obviously, when the vehicle is traveling the breaking of a connector may result in damage to the vehicle and may even be the cause of serious accidents and possible loss of life.

The object of our invention is, therefore, to provide a simple and relatively inexpensive safety connector which may be attached to the chain adjacent the ordinary connectors and which will prevent displacement of the chain when the connectors break.

The objects and advantages of the invention will be more clearly apparent as the following specification is read in connection with the accompanying drawing, in which, Figure 1 is an elevation of a portion of a wheel showing a chain and our safety connector in place;

Fig. 2 is an enlarged elevation of the safety connector; and

Fig. 3 is a similar view of a slightly different form of the invention.

Referring to the drawing 5 and 6 represent the spokes and rim respectively of a wheel which carries a tire 7. The chain, consisting of circumferential members 8 and transverse members 9, is secured in place on the tire by connectors, each comprising a pair of leaves 10 and 11 pivotally secured to a link 12 at one end of the circumferential member 8. The leaf 10 is provided with a plurality of notches 13 adapted to receive a link 14 at the other end of the circumferential member 8 which is thus secured in proper relation to the tire. The other leaf 11 serves as a lock to prevent escape of the link 14 from the notch with which it is engaged. It is, of course, understood that the purpose of the several notches is to permit adjustment of the chain to the dimensions of the tire. The foregoing forms no part of my invention, being descriptive of a well known type of tire chain which is illustrated in the drawing in order that my invention and the application thereof may be clearly understood.

Our invention comprises the auxiliary connector with means for securing it to the contiguous ends of the circumferential chain members, spanning the usual connector and adapted, when the latter breaks, to take the stress tending to disrupt the chain. In a simple embodiment of the invention, the auxiliary connector consists of a metal strip 15 having the requisite strength and preferably slightly curved as indicated in Fig. 2 to avoid engagement with the usual connector. The strip 15 is provided with holes 16 near its ends to receive links 17. For convenience in assembling, the strip 15 is cut at 18 thus permitting insertion of the links 17 into the holes 16 by springing the metal. A hook 19, provided with a resilient tongue 20, is connected to each of the links 17 and is adapted to engage links in and adjacent the ends of the circumferential members 8 of the chain. When applied the hooks 19 are so disposed that the tongues 20 face the tire and there is no danger, therefore, of accidentally releasing the hooks. The tongues may, however, be easily flexed to release the hooks when removal of the auxiliary connectors is desirable.

Another simple form of my invention is constructed of wire having sufficient strength as indicated at 21 in Fig. 3. The ends of the wire are formed into loops 22 by twisting the ends as indicated at 23. Hooks 24, having resilient tongues 25, are connected to the loops 22 and are adapted to engage the links of the chain as previously described, the hooks being arranged so that the tongues are adjacent the tire to prevent accidental displacement of the hooks.

In applying our invention, the chains are mounted on the tire in the usual manner and secured. The auxiliary connectors are then applied by engaging the hooks in the links of the chains near the ends thereof. The auxiliary connectors need not be adjusted to take the stress of the chains in normal operation since the usual connectors are adequate unless through wear or unusual conditions they are broken. In that event the auxiliary connectors prevent the chains from escaping and lashing or winding in the wheel or contiguous mechanism.

Our auxiliary connectors are relatively inexpensive, inconspicuous in use and are as easily applied and removed as are the chains. They furnish a cheap and effective insurance against damage by breaking chains and are, therefore, advantageously used in connection with the chains.

Obviously, the invention is not restricted to use with the exact form of chain illustrated in the drawing and the details of construction may be varied within the scope of the appended claims without departing from the invention or sacrificing any of the advantages as hereinbefore enumerated.

We claim:

1. The combination of a tire chain comprising circumferential and cross chains, connectors whereby the ends of the chain are joined and the chain is held in place, with auxiliary connectors comprising a pair of connected hooks adapted to engage links of said chain adjacent the free ends thereof and to receive the stresses of said chain when the usual connectors are broken.

2. The combination of a tire chain comprising circumferential and cross-chains, connectors whereby the ends of the chain are joined and the chain is held in place, with auxiliary connectors, each comprising a pair of connected hooks adapted to engage links of said chain adjacent the free ends thereof and to receive the stresses of said chain when the usual connectors are broken, said hooks being provided with spring tongues and being arranged so that these spring tongues face the tire when the auxiliary connectors are assembled with the chain.

In testimony whereof we affix our signatures.

CHARLES WILLIAM HAMMETT.
WILLIAM R. FRAZER.